United States Patent [19]

Walker, Jr.

[11] Patent Number: 4,930,806
[45] Date of Patent: Jun. 5, 1990

[54] VEHICLE SUSPENSION

[76] Inventor: James W. Walker, Jr., 125 Leavell Woods Dr., Jackson, Miss. 39212

[21] Appl. No.: 297,740

[22] Filed: Feb. 27, 1989

[51] Int. Cl.$^5$ ................................................. B60G 3/00
[52] U.S. Cl. ..................................... 280/701; 280/724
[58] Field of Search ................................. 280/701, 724

[56] References Cited

U.S. PATENT DOCUMENTS 2,097,309 10/1937 Sanders, Jr. .......................... 280/724
2,181,546 11/1939 Bradshaw ............................ 280/724

Primary Examiner—Kenneth R. Rice
Attorney, Agent, or Firm—Henderson & Sturm

[57] ABSTRACT

The disclosed suspension system utilizes a balanced spring arrangement wherein each of one or more wheel is independently journalled on a fore-and-aft beam disposed alongside a fore-and-aft frame. The wheel journal or axle is at one end of the beam and the beam is pivoted intermediate its ends to the frame on a transverse axis. Adjacent the wheel a spring acting between the beam and frame opposed upward movement of the beam and wheel, and a spring at the other end of the beam acts on the frame to oppose downward movement of that end of the beam, the two springs thus acting in unison.

4 Claims, 2 Drawing Sheets

VEHICLE SUSPENSION

BACKGROUND AND SUMMARY OF THE INVENTION

The typical wheel suspension for a vehicle involves linkages and springs that confine up and down movement of a wheel to an arc having a fore-and-aft pivot, resulting in departure of the wheel from a vertical plane as it rises and falls. This causes excessive tire wear and changes in wheel relationship during the arcuate travel, thus affecting camber, caster and toe-in. The present invention eliminates these disadvantages by providing a system in which the wheel remains in a vertical plane as it rises and falls, because the beam arrangement dictates such planar movement on account of its fore-and-aft disposition and its beam-to-frame pivot on a transverse horizontal axis.

A further feature of the invention is the use of springs ahead of and behind the beam pivot and arranged to resiliently oppose upward movement of that end of the beam on which a wheel is journalled. In this area, the spring mountings are of compact and simplified design, thus contributing to the low-cost construction and trouble-free operation of the suspension system.

Features other than those enumerated will become apparent as a preferred embodiment of the invention is disclosed in detail in the ensuing description and accompanying sheets of drawings.

DETAILED DESCRIPTION OF A PREFERRED EMBODIMENT OF THE INVENTION

Figure 1:
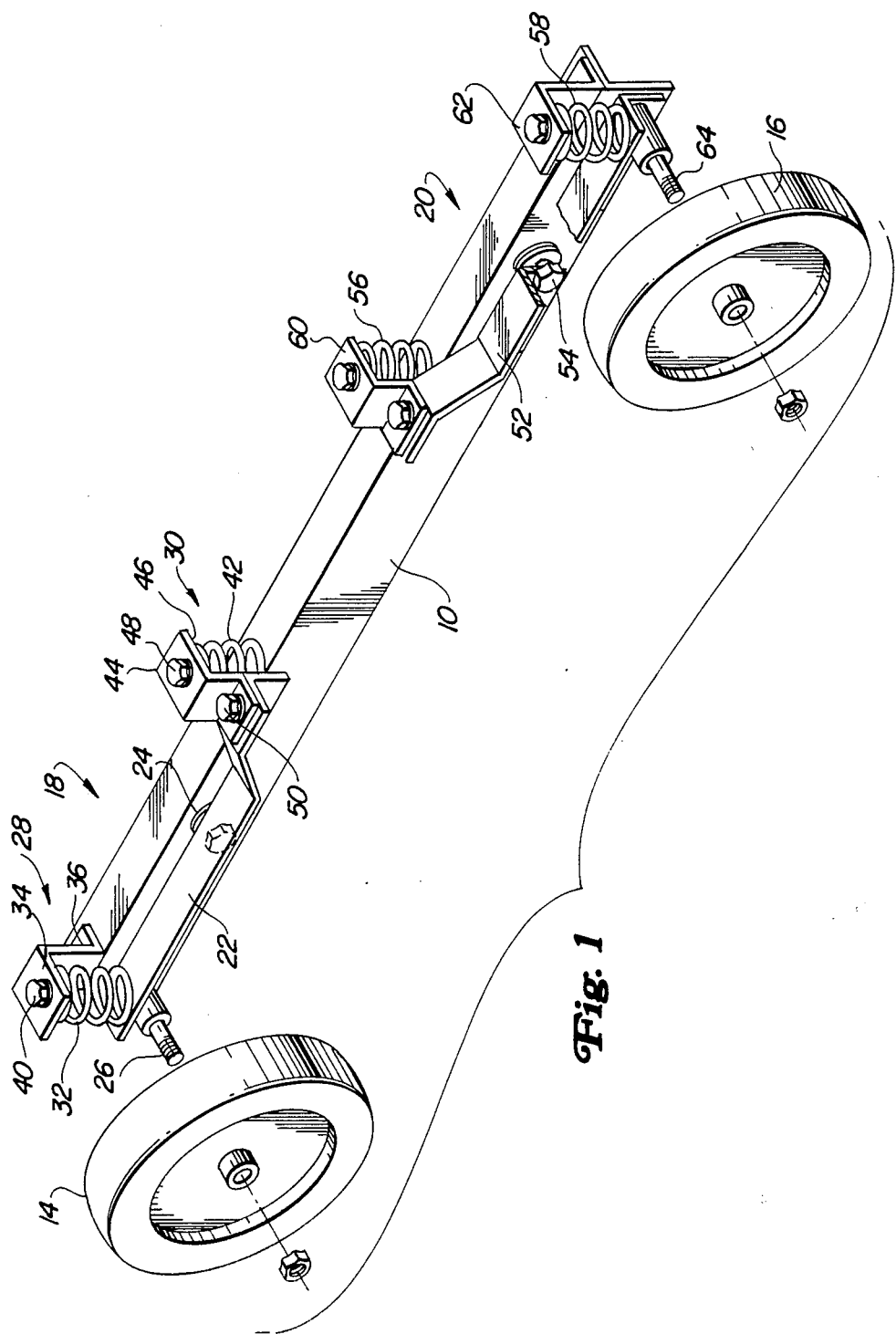
FIG. 1 is an "exploded" perspective showing the components of the invention.
Figure 2:
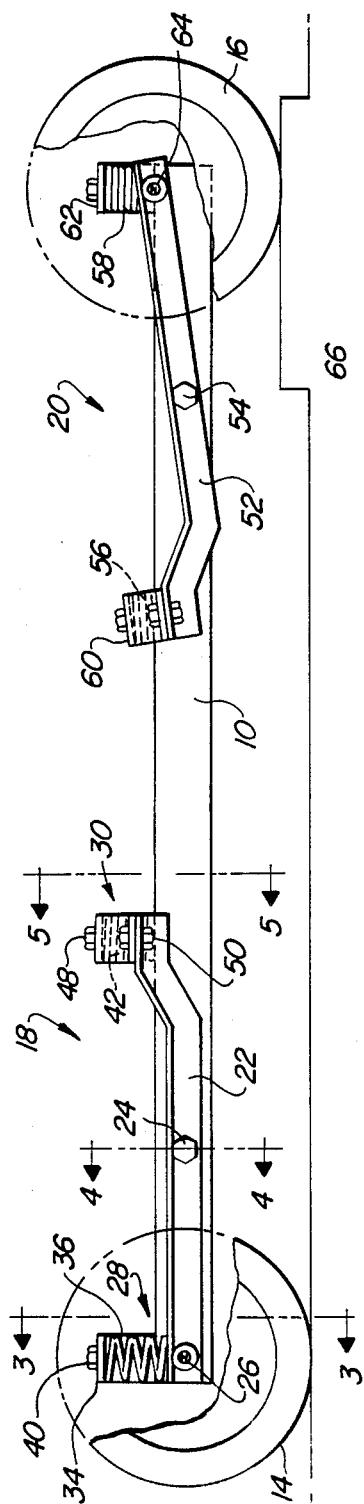
FIG. 2 is a side elevation, with portions broken away to expose background structure.
Figure 5:
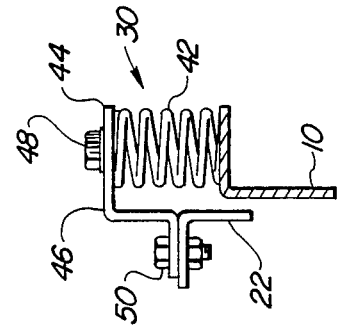
FIG. 5 is an enlarged section on the line 5—5 of FIG. 2.
Figure 4:
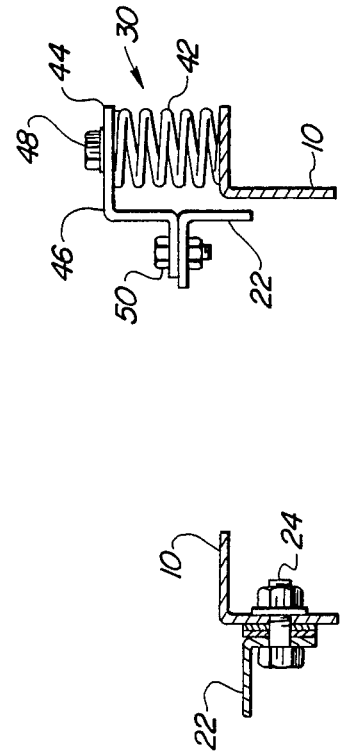
FIG. 4 is an enlarged section on the line 4—4 of FIG. 2.

The vehicle chosen for purposes of illustration comprises a chassis or main frame having opposite fore-and-aft side frame members, only one of which is shown at (10). Merely for ease of description and not by way of limitation, the front end of the frame will be that to the left of the reader. Viewed in that manner, it is seen that the frame is carried on front and rear wheels (14) and (16), respectively, by means of front and rear suspension means (18) and (20), respectively.

It will be clear that there are like suspensions at both sides of the frame. Since these are essentially identical or symmetrical, only those at one side will be described in detail. The front suspension comprises a fore-and-aft beam (22) disposed closely alongside and of course parallel to the frame member (10), which relationship will vary only to the extent that the frame may have different configurations; e.g., lateral offsets, kick-ups, etc. In any event, the length of the beam is parallel to the straight-ahead line of travel of the vehicle The beam is pivoted centrally of its front and rear ends to the frame on a transverse horizontal axis by pivot means (24). The front wheel is journalled to the front end of the beam (22) by means of a stub axle (26) which may include a steering knuckle of any suitable type. The wheel may thus rise and fall as the beam (22) rocks about its pivot (24) according to the contour of the terrain encountered as the vehicle moves over the ground. Although the wheel (14) is shown at the rear of the beam (22), it is obvious that it could be at the front end of the beam.

Figure 3:
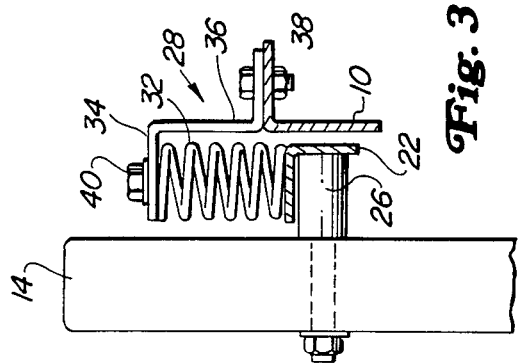
FIG. 3 is an enlarged section on the line 3—3 of FIG. 2.

Rise and fall of the wheel and thus rocking of the beam about its pivot is resiliently opposed by front and rear spring means (28) and (30), respectively. The front means (FIG. 3) comprises a coil spring (32) seated at its bottom on top of a front end portion of the beam (22) and engaged at its top by the overhanging ledge (34) of a Z-shaped member (36) that is affixed to the top of the front end of the beam (22) as by suitable securing means (38). The upper end of the spring (32) may be retained by or seated under the ledge (34) by any conventional means (40) for that purpose. From the description thus far, it is seen that the spring (32), confined between the front end of the beam (22) and the laterally adjacent part of the frame (10) will resiliently oppose upward movement of the wheel (14) as that wheel rises to accommodate bumps, etc., in the ground over which the vehicle travels. The force of the spring (32) is augmented by a coil spring (42) which acts between the rear end of the beam (22) and the frame member (10). In this case, the spring is seated at its bottom on the frame member and is engaged at its top by the upper ledge (44) of a Z-shaped member (46) which has a retainer (48) for seating the spring The member (46) is rigidly affixed to the rear end of the beam (22) by suitable means (50). Thus, as the wheel (14) rises to rock the beam, the front and rear springs are compressed accordingly, thus furnishing a balancing effect and, further, tending to keep the frame fairly level. Moreover, because of the beam-to-frame pivot (24), the rise and fall of the wheel (14) is in a vertical fore-and-aft plane.

The rear suspension (20) is symmetrical as respects the means (18), the parts being arranged in reverse order; that is to say, a fore-and-aft beam (52) is pivoted intermediate its ends to the frame on a transverse pivot (54) and carries the rear wheel (16) at its rear end. The beam (52) is spring-loaded at its opposite ends by front and rear coil springs (56) and (58) which function like those at (42) and (32) respectively. Front and rear brackets or Z-shaped members (60) and (62) act between the springs and rear beam to provide action like that described in connection with the front suspension (18). A stub axle (64) journals the rear wheel (16) on the rear end of the rear beam (52). An elevation (66) in the road is indicated to illustrate the "step-up" of the rear wheel (16). Here again, the wheel (16) could be at the front end of the beam (52) along with front end disposition of the front wheel at the front end of its beam.

The function and operation of the front and rear suspension will be clear from the description of their components. Features and advantages in addition to those pointed out will become apparent to those versed in the art, as will many modifications in the preferred embodiment disclosed, all without departure from the scope of the invention.

I claim:

1. A vehicle suspension, comprising a fore-and-aft frame, a fore-and-aft beam disposed alongside the frame and having first and second ends, pivot means disposed on the frame and operatively connected intermediate the ends of the beam for positioning the longitudinal axes of the frame and the beam in the same general horizontal plane and for operatively mounting the beam on the frame for receiving relative to the frame about a transverse axis, a ground-engaging wheel journalled on the second end of the beam relative to the frame, and first spring means operative between the top of the front end of the beam and a transversely aligned portion of the top of the frame for yieldingly resisting downward movement of the front end of the beam; a first support rigid on the first end of the beam and projecting laterally inwardly in spaced-above overhanging relation to the portion of the frame in transverse alignment with the first end of the beam and a first spring operative between said first support and said aligned portion of the frame in which the second spring includes a second support rigid on the frame in transverse alignment with the second end of the beam and projecting laterally outwardly in spaced-above overhanging relation to said second end of the beam, and a second spring operative between said second end of the beam and said support.

2. A vehicle suspension according to claim 1 in which the second support is a Z-shaped member having a bottom ledge fixed to the frame and an upper ledge overhanging the second end of the beam and the second spring is operative between the upper ledge and the beam second end, and the first support is a Z-shaped member having a bottom ledge fixed to the first end of the beam and an upper ledge overhanging the frame, and a first spring operative between the upper ledge and the frame.

3. A vehicle suspension according to claim 2 in which the upper end of the second spring is fixed to the upper ledge of the second support and the upper end of the first spring is fixed to the upper ledge of the first support.

4. A vehicle suspension according to claim 3 in which each spring is a coiled compression spring.

* * * * *